United States Patent Office 3,034,908
Patented May 15, 1962

3,034,908
METHOD FOR PRODUCING METALLIC-CERAMIC BODIES
Peter Sawchuk, Corning, N.Y., assignor to Corning Glass Works, Corning, N.Y., a corporation of New York
No Drawing. Filed May 31, 1960, Ser. No. 32,534
8 Claims. (Cl. 106—65)

The present invention relates to methods for producing compositions of matter containing metallic and ceramic components and having many of the desirable properties of each.

Such metallic-ceramic bodies, sometimes referred to as "cermets," are known to the prior art and are characterized by a highly refractory nature, a high degree of hardness, good electrical conductivity and variable abrasive characteristics. The cermets produced according to the present invention are especially desirable as parts for use where contact with molten aluminum is required, since they are not affected by such contact.

It is known in the prior art that when a body comprising a compound of silicon and oxygen is immersed in a bath of molten aluminum at a temperature from 700° C. to 900° C., the siliceous body is transformed into a body of the same size and shape but with a new composition resembling in some respects both a metal and a ceramic and comprising a mixture of aluminum oxide and an alloy of aluminum and silicon. See: George, U.S. Patent 2,702,750.

The present applicant has found that a superior product is formed when an amount of pure molten silicon is maintained in the aluminum bath to the extent of from 20% to 35% of the bath by weight and at the same time the bath is maintained at a temperature between 900° C. and 950° C., depending upon the amount of silicon present. Although any compound of silicon and oxygen may be reacted in the bath, it has been found that the best product is formed when the body to be immersed is formed of a high silicate glass which has been made into a powder, pressed or slip cast into the desired shape and then sintered. The present invention is not limited in application to such sintered bodies, however.

Cermets produced according to the method of the present invention have the advantage of a homogeneous structure and are free from the voids, cracks and weak spots which are found in cermets produced by previous methods.

Accordingly, it is an object of the present invention to provide a process whereby it is possible to produce a cermet which has a more homogeneous composition and fewer defects than those produced by the former processes.

When a silicate is reacted in a molten aluminum bath to form a cermet, pure silicon is deposited in the bath as a by-product of the reaction. If the temperature of the bath is held only slightly above 900° C., it has been found that as the silicon content rises there is an improvement in the properties of the product until at the level of about 20% silicon a product is formed which is free of any apparent voids or cracks. As the silicon content increases above this point, it soon becomes necessary to effect an increase in the temperature of the bath in order to maintain a constant reaction rate and to prevent precipitation of silicon and stiffening of the bath. It has been found that good results can be obtained with a silicon content as high as 35% if the temperature is increased to about 950° C. Beyond this temperature and silicon content, equilibrium is difficult to maintain, and greatly increased reaction rates lead to a significant loss in strength of the product.

When the temperature of the bath falls below 900° C. and the silicon content is maintained within the 20% to 35% range, silicon tends to be precipitated out, and the reaction proceeds at a much retarded rate.

The exact percentage of silicon in the bath can be determined by chemical analysis. In practice, however, it is advantageous to keep a constant check on the silicon content by means of thin quickly-reacted test bars of a silicate material which are periodically inserted into the bath and the characteristics of which can be easily observed upon removal. When the silicon content increases beyond 35% and the temperature of 950° C. can no longer maintain the constituents in equilibrium, or when the test bars exhibit flaws indicating improper conditions, the bath can be brought back to the desired level by the addition of aluminum. The silicon content may initially be brought to within the desired range either by reaction of silicates with the molten aluminum as above described or by addition of pure silicon to the bath.

The following example will illustrate the present process:

A glass composed of approximately 94.5% $SiO_2$, 3.5% $B_2O_3$, 1.5% $Al_2O_3$ and 0.5% $Na_2O$ was ground to a powder, pressed into the shape of a container approximately ½ inch in thickness and sintered. The container was then filled with molten aluminum and reacted at 910° C. for approximately 96 hours to transform the container into a metallic-ceramic substance capable of holding a bath of molten aluminum and silicon without reacting therewith.

The container thus produced was filled with a mixture of 70% aluminum and 30% silicon and placed in a furnace at a temperature of about 910° C. The mixture was allowed to melt to form an aluminum-silicon bath with a temperature of about 910° C.

The materials to be reacted were formed by powdering, pressing and sintering glass of the same composition as that used in forming the container. They were then cleaned with isopropanol, preheated to 910° C., held at that temperature for approximately one-half hour and then immersed in the bath for periods depending upon the thickness of the objects. Objects having thicknesses of ¼ and ½ inches required immersion for 24 and 72 hours respectively.

The products exhibited homogeneous structures with no apparent voids or cracks. Investigation showed the following physical properties:

Modulus of rupture in thousands of pounds per square inch was found to be 42, 35, 29, 20, 7 and 5 at room temperature, 200, 400, 500, 600 and 800 degrees C. respectively.

Rockwell hardness measurements varied between C-45 and C-51.

Electrical resistivity increased from $1 \times 10^{-4}$ ohm-cm. at room temperature to $3 \times 10^{-4}$ ohm-cm. at 500° C.

Values of Young's modulus and Poisson's ratio averaged $32.5 \times 10^6$ p.s.i. and 0.267 respectively.

Over a temperature range from room temperature to 550° C., employing C.G.S. units, diffusivity decreased from 0.08 to 0.06, conductivity was nearly constant around 0.06 and specific heat increased from 0.2 to 0.3.

What is claimed is:

1. The method of producing a metallic-ceramic body which comprises enveloping an object comprising a silicate glass in a molten bath comprising a mixture of 20% to 35% by weight silicon and the remainder aluminum at a temperature between 900° C. and 950° C. for a time sufficient to transform a substantial portion of the said object into a body comprising particles of aluminum oxide in interstitial relation with an alloy of aluminum and silicon.

2. The method according to claim 1 in which the said silicate glass comprises a silicate glass which has been divided into particles, which particles have then been formed into a single mass by sintering.

3. In the process for transforming an object comprising a silicate glass into a body comprising particles of aluminum oxide in interstitial relation with an alloy of aluminum and silicon including the step of bringing said object into contact with a bath containing molten aluminum for a time sufficient to effect said transformation, the improvement comprising the steps of incorporating into said bath from 20 to 35 weight percent of silicon and maintaining the temperature of said bath between 900° C. and 950° C.

4. The method according to claim 3 in which the said silicate glass comprises a silicate glass which has been divided into particles, which particles have then been formed into a single mass by sintering.

5. The method according to claim 4 in which the said silicate glass comprises approximately 94.5% silica.

6. The method of producing a metallic-ceramic body including the steps of providing an object comprising a silicate glass, providing a bath comprising a mixture of from 20% to 35% by weight silicon and the remainder aluminum, maintaining the temperature of said bath between 900° C. and 950° C. and bringing said object into contact with said bath for a time sufficient to transform a substantial portion of the said object into a mixture comprising particles of aluminum oxide in interstitial relation with an alloy of aluminum and silicon.

7. The method according to claim 6 in which the said silicated glass comprises a silicate glass which has been divided into particles, which particles have been formed into a single mass by sintering.

8. The method according to claim 7 in which the said silicate glass comprises approximately 94.5% silica.

References Cited in the file of this patent

UNITED STATES PATENTS 2,702,750   George _____ Feb. 22, 1955